US007085534B2

(12) United States Patent
Bentley

(10) Patent No.: US 7,085,534 B2
(45) **Date of Patent: *Aug. 1, 2006**

(54) WIRELESS TRANSMITTER AND DOORBELL SYSTEM

(75) Inventor: Roger Donn Bentley, Coloma, MI (US)

(73) Assignee: Desa IP LLC, Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/890,608

(22) Filed: Jul. 14, 2004

(65) Prior Publication Data

US 2004/0257222 A1 Dec. 23, 2004

Related U.S. Application Data

(63) Continuation of application No. 10/037,713, filed on Jan. 3, 2002, now Pat. No. 6,775,523.

(51) Int. Cl.
*H04B 7/00* (2006.01)
*H04B 1/02* (2006.01)
*H04Q 7/00* (2006.01)

(52) U.S. Cl. ...................... 455/41.2; 455/91; 455/128; 455/90.3; 455/575.8; 340/539.1; 340/539.14

(58) Field of Classification Search ............... 455/41.1, 455/41.2, 91, 95, 100, 106, 128, 129, 90.1, 455/90.2, 90.3, 575, 575.7, 575.8; 340/539.1, 340/539.11, 539.14, 539.15, 391.1, 392.1, 340/396.1
See application file for complete search history.

(56) References Cited

U.S. PATENT DOCUMENTS

| | | | | |
|---|---|---|---|---|
| 5,475,369 | A * | 12/1995 | Baker | 340/573.3 |
| 5,576,690 | A * | 11/1996 | Waugh et al. | 340/539.1 |
| 5,901,202 | A * | 5/1999 | Lam | 379/22 |
| 6,259,785 | B1 * | 7/2001 | Shaffer et al. | 379/265.02 |
| 6,414,589 | B1 * | 7/2002 | Angott et al. | 340/326 |
| 6,510,324 | B1 * | 1/2003 | Fukumura | 455/550.1 |
| 6,606,030 | B1 * | 8/2003 | Vena | 340/573.3 |
| 6,775,523 | B1 * | 8/2004 | Bentley | 455/91 |
| 6,825,751 | B1 * | 11/2004 | Kita et al. | 340/5.61 |
| 2001/0024944 | A1 * | 9/2001 | Shiraki et al. | 455/90 |
| 2002/0071346 | A1 * | 6/2002 | Paratte et al. | 368/10 |
| 2003/0013503 | A1 * | 1/2003 | Menard et al. | 455/569 |
| 2003/0058071 | A1 * | 3/2003 | Yang | 335/205 |
| 2003/0117900 | A1 * | 6/2003 | Fujisawa et al. | 368/47 |
| 2005/0057358 | A1 * | 3/2005 | Chen | 340/539.14 |

FOREIGN PATENT DOCUMENTS

| | | |
|---|---|---|
| EP | 0702383 A1 * | 9/1995 |
| JP | 62-277801 * | 12/1987 |

* cited by examiner

*Primary Examiner*—Duc M. Nguyen
(74) *Attorney, Agent, or Firm*—John F. Salazar; Middleton Reutlinger

(57) ABSTRACT

A wireless doorbell system which employs a radio frequency ("RF") transmitter and a RF receiver. The doorbell transmitter has its RF source and antenna enclosed within a metal case which is designed so that the effective operating range of the transmission of the RF signals is not reduced to unacceptable levels and whose finish, such as polished brass, presents an attractive appearance which can be made to match the decorative trim at the entranceway to a building, such as a residence.

18 Claims, 3 Drawing Sheets

FIG. 3
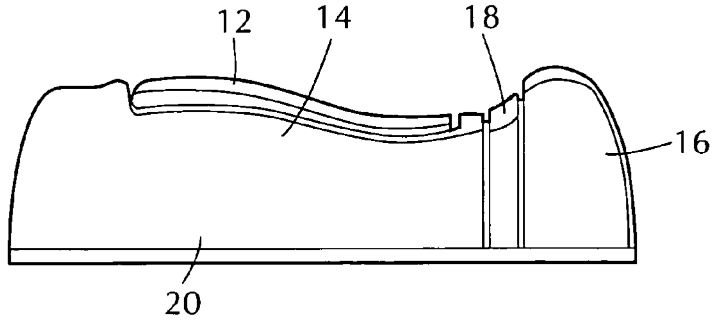
FIG. 4
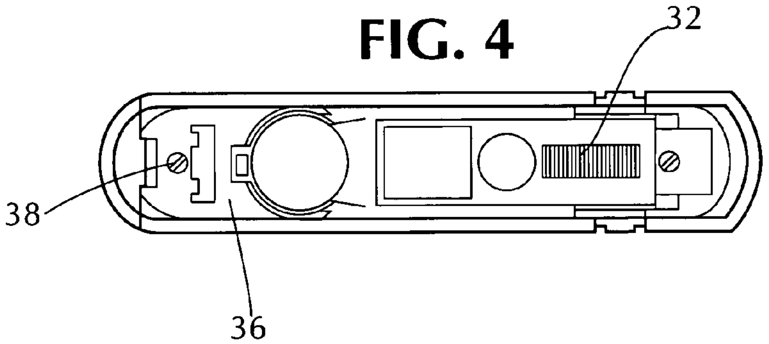
FIG. 6
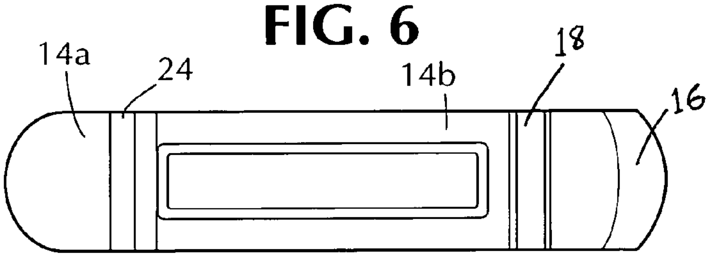
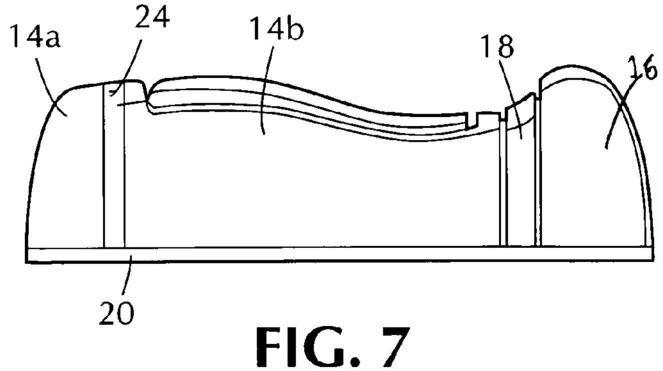
FIG. 7

WIRELESS TRANSMITTER AND DOORBELL SYSTEM

This application is a continuation of and claims priority to U.S. patent application Ser. No. 10/037,713, filed on Jan. 3, 2002, which is incorporated by reference.

BACKGROUND OF THE INVENTION

1. Field of the Invention

The present invention relates generally to wireless transmitters and more particularly to wireless doorbell systems which employ radio frequency ("RF") transmitters and receivers.

2. Description of the Related Art

Wireless doorbell systems have become an increasingly popular option for persons wishing either to replace their current doorbell system or to add additional doorbells at their place of business or residence. A typical wireless doorbell system generally comprises at least one RF transmitter powered by a battery or other power source, such as existing electrical wiring, and a RF receiver. In response to the depression of a button or other activating means on the transmitter, an electrical circuit is completed within the transmitter which energizes an oscillator or other means for generating a RF signal. The generated RF signal is then, with the aid of an antenna, transmitted a certain distance for reception by the receiver. The receiver alerts, for example, a homeowner that the doorbell button has been depressed by producing an audible signal, such as a tone or melody, upon detecting the transmitted RF signal.

One drawback of using a prior art wireless doorbell system is the aesthetic appearance of the transmitter. Because metal tends to act as a shield to RF transmissions, that is, it reduces the strength of the RF signals emanating from the transmitter, wireless doorbell transmitters are generally housed in plastic cases to allow the RF signals to radiate unimpeded from the transmitter the necessary distance to the receiver.

A further drawback of prior art doorbell transmitters housed in a plastic case is that the color or finish of the plastic oftentimes will not match the decorative trim at the entrance area of a residence. This trim might typically include polished brass doorknobs, kick plates or lighting fixtures.

Yet another drawback is that the plastic casing of prior art doorbell transmitters may crack and become unsightly after some period of exposure to the temperature extremes of the weather and the sun's ultraviolet rays. Additionally, the plastic color or finish of the prior art doorbell transmitters tends to fade over time creating a less than pleasing appearance.

Finally, another draw back of using a prior art plastic doorbell-transmitter is its lack of physical security because it is made of an easily vandalized plastic case.

Some prior art doorbell transmitters have used a limited amount of a thin metal coating on their top surface in an effort to improve the visual appearance of the doorbell transmitter without reducing the effective range of the RF transmissions to unacceptable levels. For example, the Dimango@ Model RC3321 uses metal paint or a similar metallic-based coating on but a small area (the top surface only) of the plastic case. While such a transmitter may have an acceptable effective range, it does not meet the aesthetic requirements of matching the styling and finish of nearby entranceway trim since it does not have the appearance of metal, nor does this prior art transmitter offer the longevity or physical security of a solid metal casing.

Heretofore a wireless doorbell transmitter having its RF source enclosed within a solid metal case would have such a limited effective range that its use would be unacceptable in a residential dwelling.

SUMMARY OF THE INVENTION

For the foregoing reasons, the need exists for a wireless doorbell system 10 having a doorbell transmitter housed in a solid metal case.

It is thus an object of the present invention to provide a wireless transmitter and, more particularly, a wireless doorbell transmitter housed in a solid metal case which does not reduce the effective operating range of the transmitter and whose finish, such as polished brass, presents an attractive appearance which can be made to match the decorative trim at the entrance way to a business or residence.

It is a further Object to the present invention to improve upon me physical security and resistance to breakage of prior art plastic wireless doorbell transmitters by providing a wireless doorbell transmitter and antenna housed within a metal decorative case.

In accordance with the foregoing objects, a wireless doorbell system having a wireless doorbell transmitter housed in a metal decorative case is disclosed. Briefly stated, the invention is practiced by separating the metal case into two or more electrically isolated sections that allow the doorbell transmitter to function effectively without the RF signal attenuation and resulting poor range normally associated with a metal doorbell transmitter case. A thin separation (an electrically non-conductive gap) between the electrically isolated metal sections allows the doorbell transmitter to have an attractive appearance yet the separation also allows effective RF performance. An antenna is located within the metal case so that an external antenna, which detracts from the aesthetic appearance and could be subject to vandalism, is not required.

Further objects, features, aspects and advantages will be readily apparent to those skilled in the art and a better understanding of the present invention may be had by reference to the following detailed description taken in connection with the following drawings.

BRIEF DESCRIPTION OF THE DRAWINGS

FIG. 3 is a left side view of the wireless doorbell transmitter of the present invention.

FIG. 4 is a bottom view of the wireless doorbell transmitter of the present invention with its back cover removed.

FIG. 6 is a top plan view of a second embodiment of the doorbell transmitter of the present invention.

FIG. 7 is a left side view of the second embodiment of the doorbell transmitter of the present invention.

DETAILED DESCRIPTION OF THE INVENTION

Figure 1:
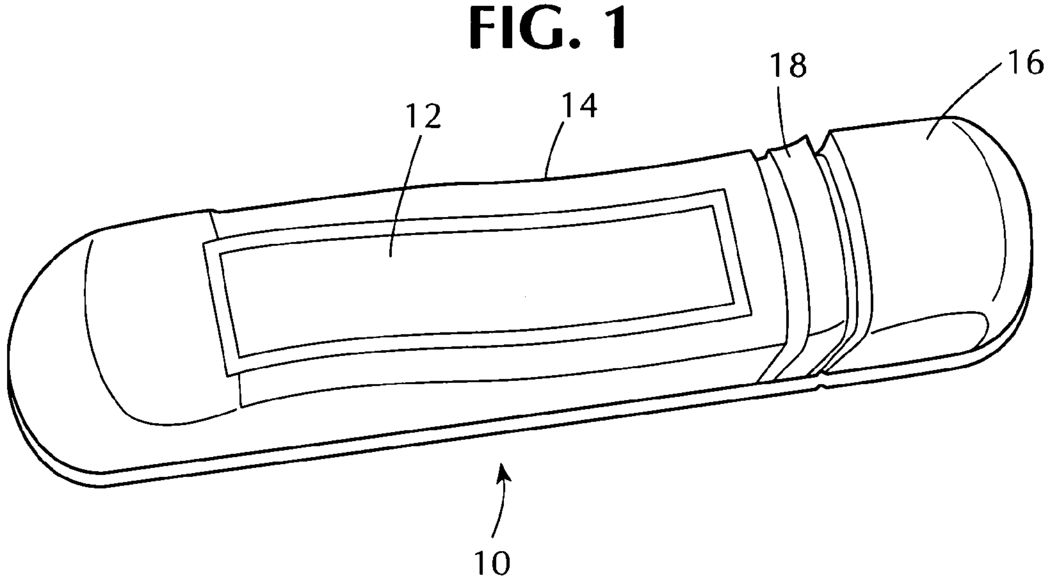
FIG. 1 is a top plan view of the wireless doorbell transmitter of the present invention.
Figure 5:
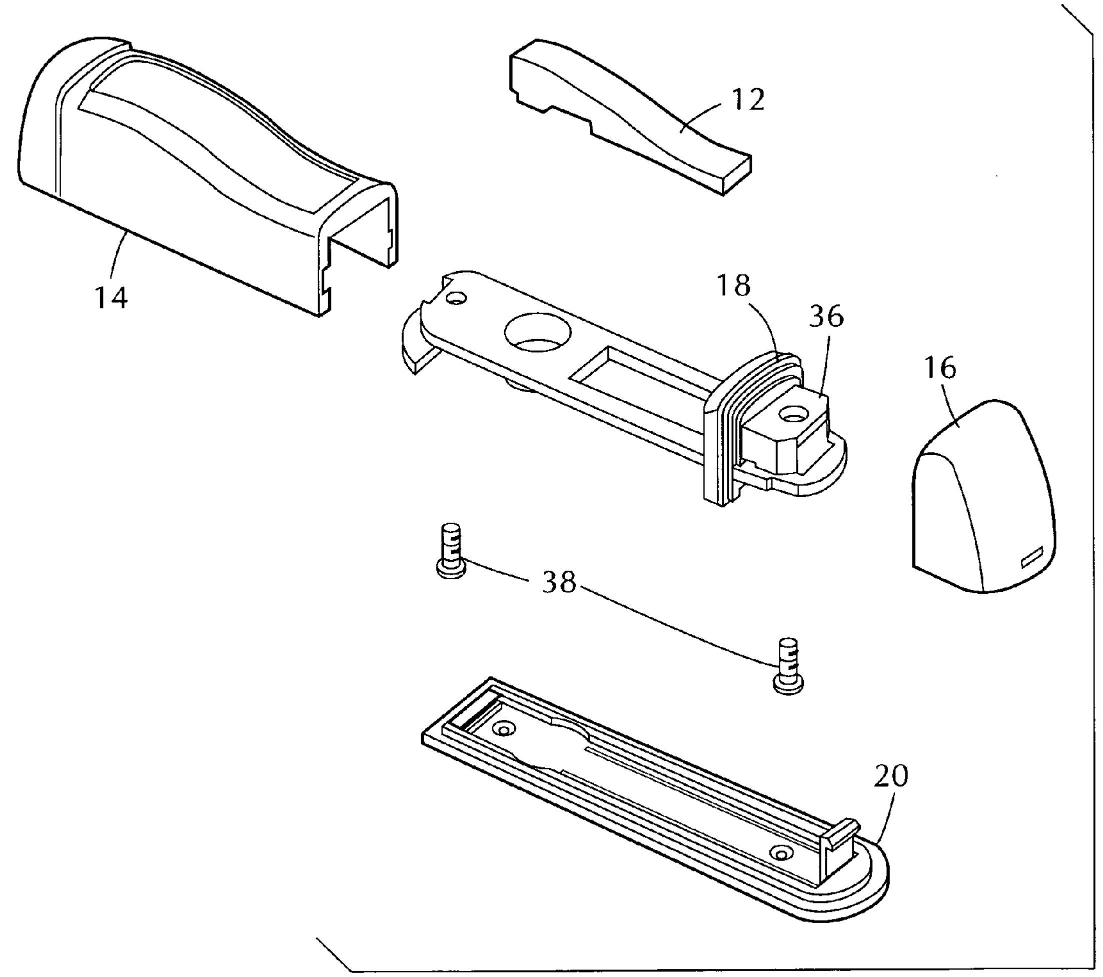
FIG. 5 is an exploded view of one embodiment of the doorbell transmitter of the present invention.

Referring now to the drawings there is shown in FIG. 1 a wireless doorbell transmitter 10 housed in a solid metal decorative case. The case may be made of any metal but is preferably constructed of a decorative metal such as brass, bronze, aluminum, zinc, stainless steel and chrome or other plated steel. The selection of the metal depends upon the aesthetic preference and requirements of the consumer. In one embodiment the metal case of the transmitter 10 is divided into two electrically isolated sections 14 and 16 defining an electrically non-conductive gap there between. In the preferred embodiment the electrically non-conductive gap is filled by thin separator 18. The first section (main housing) 14 and the second section (antenna housing) 16 are secured to a plastic holder 36 by screws 38 or other attaching means (see FIG. 5). Back cover 20 is also secured to plastic holder 36 by attaching means (not shown). Back cover 20 is constructed of a non-metallic material to avoid adversely affecting antenna 32 and to space the antenna away from metal in those applications 20 where the transmitter 10 is mounted on a metal surface.

In a second embodiment of the invention, the metal case of the transmitter 10 is divided into three electrically isolated sections (14*a*, 14*b*, 16) as 5 shown in FIGS. 6 and 7 to create a different, symmetrical, aesthetic impression. In this second embodiment a second electrically non-conductive gap is defined by sections 14*a* and 14*b*. The second electrically non-conductive gap may be filled by a second separator 24.

Figure 2:
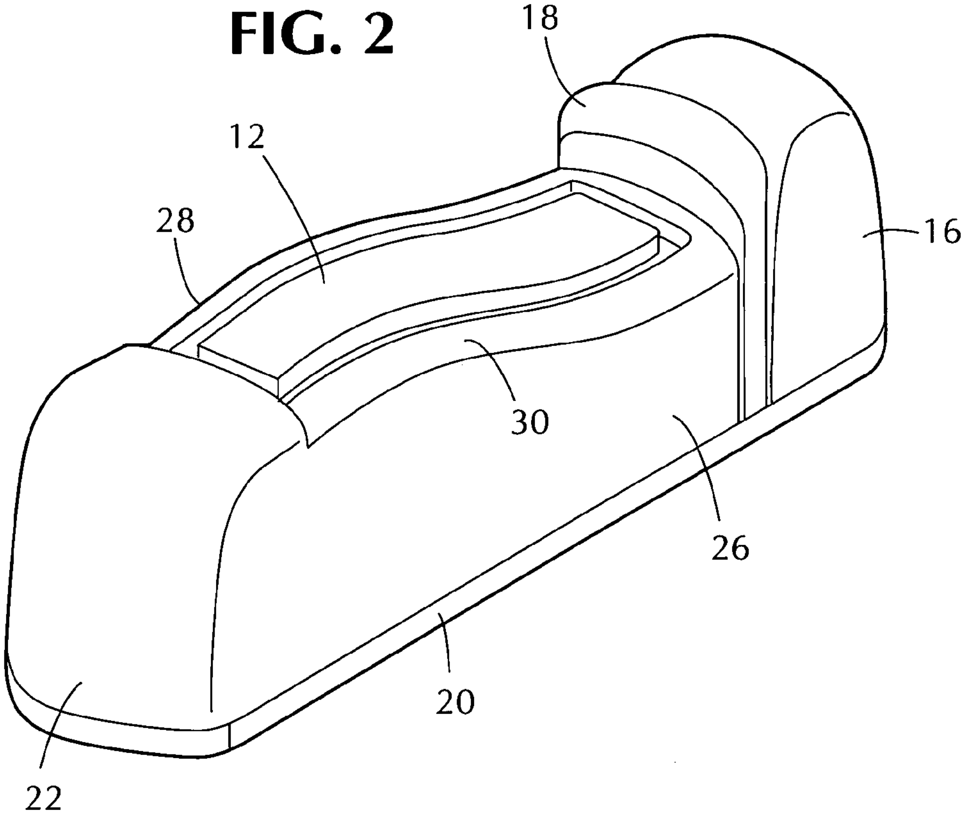
FIG. 2 is a left side perspective view of the wireless doorbell transmitter of the present invention.

Main housing 14 functions as a weather-resistant enclosure for an electric circuit, a RF generating means and, optionally, a self-contained power source such as a battery. Main housing 14 is formed by a front wall 22, two side walls 26 and 28 and a top surface 30 (see FIG. 2). Each wall and the top surface of main housing 14 are constructed of solid metal. Disposed within top surface 30 of main housing 14 is 10 push bar 12 or other activating means, such as a push button, constructed of solid metal which, when moved or depressed by a user, completes an electric circuit within wireless doorbell transmitter 10. The electric circuit can also be completed by a transducer or magnetic contact. The electric circuit when completed may, for example, activate an encoder which drives a high frequency RF oscillator, or other means for generating a RF signal, on and off at a modulation frequency. The encoder and the RF signal generator are disposed within wireless doorbell transmitter 10. The encoding circuitry could be a microprocessor, discrete components forming low frequency oscillations or pulse, an encoder integrated circuit, or other means known to one of ordinary skill in the art. The RF signal generator could be simply an oscillator, one of the RF integrated circuits currently available in the marketplace, an RF amplifier driven by a RF oscillator, or other means of generating an RF signal known to one of ordinary skill in the art. Power is supplied through the completed electric circuit to the means for generating a RF signal by either a battery within transmitter 10, typically a low voltage (less than 12 volts) battery, or by a permanent power source located externally from wireless doorbell transmitter 10.

Weather-resistant antenna housing 16 is constructed of solid metal and in the preferred alternative houses a portion of an antenna 32 (see FIG. 4) for transmitting the generated RF signals to a signal receiver, such as a doorbell chime. The signal receiver alerts the homeowner that the push bar 12 or other activating means has been moved or depressed by producing an audible signal, such as a tone or melody, upon detecting the transmitted RF signal. Antenna 32 need not be completely located within antenna housing 16 for the wireless transmitter 10 of the present invention to work effectively. Antenna 32 may be partially located within main housing 14, beneath separator 18 or beneath second separator 24.

A RF tuned circuit single turn loop is typically used in prior art wireless doorbell transmitters as an omni-directional antenna for transmitting RF signals to a receiver. In the present invention, however, it was found that the metal case of the antenna housing 16 and the main housing 14 adversely affected such a RF tuned circuit single turn loop design. That is, the effective range of the doorbell transmitter was reduced to unacceptable levels. A helical design for antenna 32 was found to provide a more effective pattern for RF radiation from the wireless doorbell transmitter in conjunction with separator 18 than a single turn loop.

When used, separator 18 is constructed of any non-conductive material that electrically isolates the main housing 14 and the antenna housing 16. The preferred material for the separator 18 is a plastic with good insulating characteristics such as polycarbonate. Other suitable non-conductive materials include glass, wood, air and rubber. It has been found through testing that separator 18 should have a thickness of about 0.080 inches or greater to achieve an effective range of 125 feet. That is, the distance (electrically non-conductive gap) between the main housing 14 and the antenna housing 16 should be about 0.080 inches or greater.

In a second embodiment of the invention, a second electrically non conductive gap divides main housing 14 into two sections 14*a* and 14*b*. This second electrically non-conductive gap may optionally be filled by a second separator 24 as illustrated in FIGS. 6 and 7. Said second separator 24 is constructed of any non conductive material that electrically isolates section 14*a* from section 14*b* and has a sufficient thickness to separate section 14*a* from section 14*b* to allow effective coupling of the RF signal into the environment external to transmitter 10. The preferred material for the second separator 24 is a plastic with good insulating characteristics, such as polycarbonate. Other suitable non-conductive materials include, but are not limited to, glass, wood, air and rubber.

In this manner a wireless doorbell system having a doorbell transmitter housed in a metal decorative case is provided which readily avoids the problems and shortcomings associated with prior art wireless doorbell transmitters. A wireless doorbell transmitter which does not reduce the effective operating range of the RF signal transmissions and whose finish presents an attractive appearance which can be 8 made to match the decorative trim at the entranceway to a residence has been described.

The preferred embodiment has been illustrated and described. Further modifications and improvements may be made thereto as may occur to those skilled in the art and all such changes as fall within the true spirit and scope of this invention are to be included within the scope of the claims to follow.

What is claimed is:

1. A wireless doorbell transmitter, comprising: a power source; a metal doorbell case divided into at least two electrically isolated sections by an electrically non-conductive gap; an electrical switch; an antenna within said metal doorbell case; an RF signal generator electronically connected to said electrical switch; said power source, electrical switch, antenna and said RF signal generator electronically connected, said RF signal generator energized by said power source when said electrical switch is closed.

2. The wireless doorbell transmitter of claim 1 wherein said non-conductive gap in said doorbell case is separated by a non-conductive material.

3. The wireless doorbell transmitter of claim 1 wherein said non-conductive gap is about 0.08 inches.

4. The wireless doorbell transmitter of claim 1 wherein said antenna is positioned near said non-conductive gap.

5. The wireless doorbell transmitter of claim 1 wherein said RF generator is an encoder connected to a high frequency RF oscillator.

6. The wireless doorbell transmitter of claim 1 wherein said RF generator is an RF integrated circuit.

7. The wireless doorbell transmitter of claim 1 wherein said RF generator is an RF amplifier driven by an RF oscillator.

8. The wireless doorbell transmitter of claim 1 wherein said antenna is a helical antenna positioned near said non-conductive gap.

9. The wireless doorbell transmitter of claim 8 wherein said non-conductive gap is about 0.08 inch.

10. A metalized housing wireless doorbell transmitter, comprising: a metal doorbell case divided into a first metal section and a second metal section; a non-conductive gap material positioned between said first metal section and said second metal section; an antenna located near said non-conductive gap material within said case; a push-button switch electrically connected to said antenna, a power source and a radio frequency signal generator.

11. The doorbell transmitter of claim 10 further comprising an encoder electrically connected between said push-button switch and said radio frequency signal generator.

12. The doorbell transmitter of claim 10 wherein said non-conductive gap material has a width of at least 0.08 inches.

13. The doorbell transmitter of claim 12 wherein said radio frequency generator is a high frequency RF oscillator.

14. A wireless doorbell transmitter, comprising: a doorbell housing divided into a first section and a second section, each of said first and second section having a metal covering; a non-conductive gap material positioned between said first metal section and said second metal section and having a width of at least about 0.08 inches; an antenna located near said non-conductive gap material within said case; a push-button switch electrically connected to said antenna, a power source and a radio frequency signal generator.

15. A metal wireless doorbell transmitter case, comprising: a metal doorbell case divided into at least two electrically isolated sections by an electrically non-conductive gap; an electrical push button switch held within said doorbell case.

16. The metal wireless doorbell transmitter case of claim 15 further comprising an antenna positioned adjacent said non-conductive gap.

17. The metal wireless doorbell transmitter case of claim 16 wherein said non-conductive gap is a polycarbonate material.

18. A metal wireless doorbell transmitter case, comprising: a metal doorbell case divided into at least two electrically isolated sections by an electrically non-conductive gap of a polycarbonate material at least 0.08 inches; an electrical push button switch held within said doorbell case; an antenna positioned adjacent said non-conductive gap.

* * * * *